(No Model.)
H. RÖSSLER.
PROCESS OF MAKING CUPRIC SULPHATE.
No. 286,735. Patented Oct. 16, 1883.
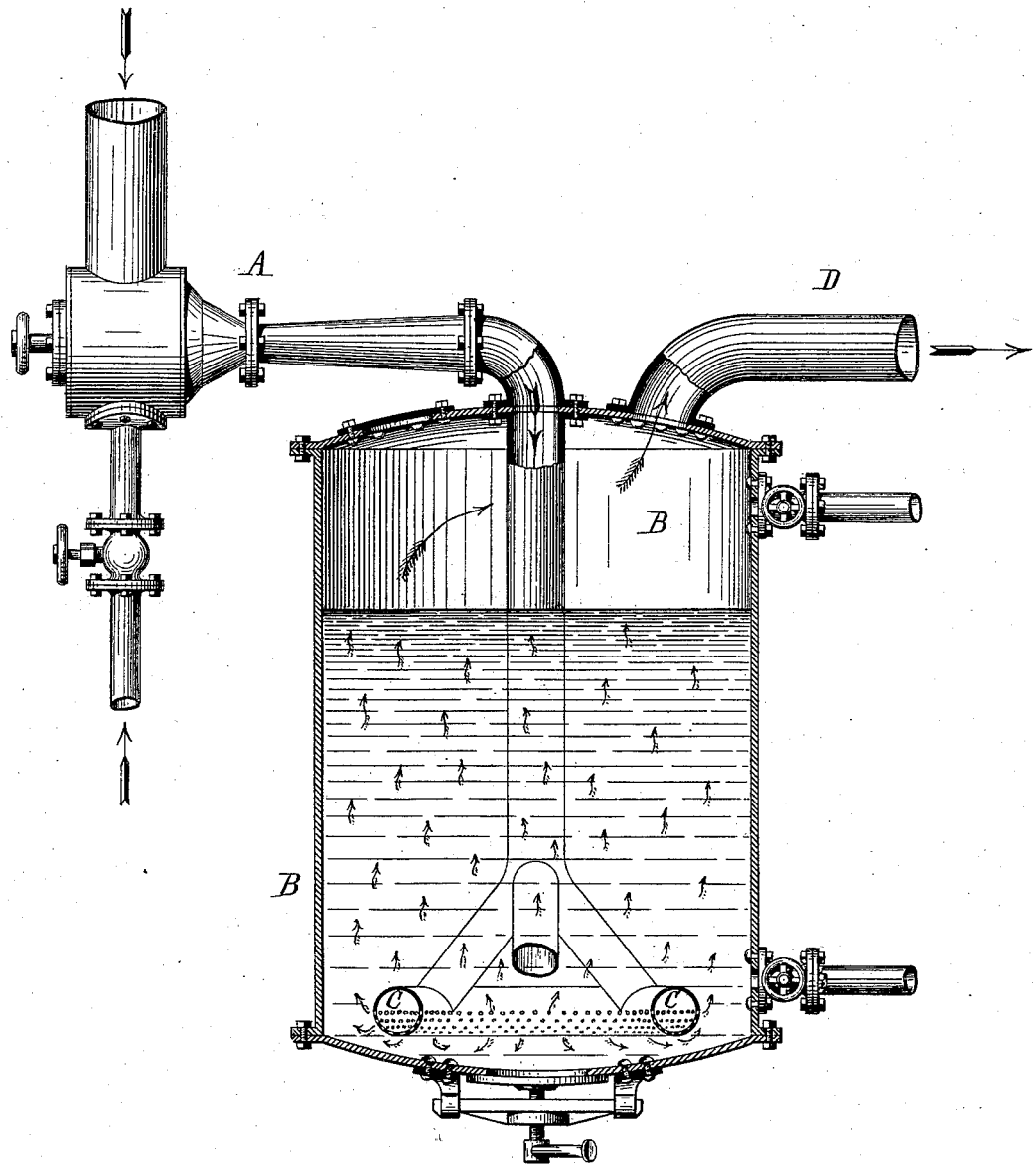
WITNESSES:
INVENTOR
Heinrich Rössler
BY Paul Goepel
ATTORNEY

UNITED STATES PATENT OFFICE.

HEINRICH RÖSSLER, OF FRANKFORT-ON-THE-MAIN, GERMANY, ASSIGNOR TO FRANZ RÖSSLER, OF BROOKLYN, NEW YORK.

PROCESS OF MAKING CUPRIC SULPHATE.

SPECIFICATION forming part of Letters Patent No. 286,735, dated October 16, 1883.

Application filed April 27, 1883. (No model.) Patented in France December 23, 1881, No. 146,926; in Belgium December 23, 1881, No. 56,572; in England December 23, 1881, No. 5,621; in Italy February 14, 1882, XXVII, 375; in Spain May 23, 1882, No. 482, and in Austria September 17, 1882, No. 37,231.

*To all whom it may concern:*

Be it known that I, HEINRICH RÖSSLER, of Frankfort-on-the-Main, in the Empire of Germany, have invented certain new and useful Improvements in the Method of Producing Sulphate of Copper by Means of Gases Containing Sulphurous Acid, of which the following is a specification.

Various attempts have heretofore been made to utilize the sulphurous-acid gases which are contained in the gases of separating ultramarine and other chemical and metallurgical works, so that not only the noxious influence of the sulphurous-acid gas upon the surrounding vegetation is neutralized, but, furthermore, the direct utilization of the same for commercial purposes is obtained. These attempts have been but partially successful, as only a small percentage of the sulphurous-acid gases could be transformed into sulphuric acid except by the employment of the expensive lead-chambers used in sulphuric-acid manufacture.

The object of this invention is to produce sulphate of copper from gases that contain sulphurous acid, and more especially to utilize the sulphurous-acid gases contained in the waste gases of separating and other chemical and metallurgical works; and the invention consists in the manufacture of sulphate of copper by forcing the gases containing sulphurous acid in a finely-divided state, jointly with air and steam, through a solution of sulphate of copper containing free metallic copper.

My invention is based upon the following observations: If gases containing sulphurous acid and sulphuric acid are forced, together with air and steam, through water in which is suspended so-called "cement" copper or "metallic" copper in a finely-divided state, then a large quantity of the sulphurous acid is oxidized by the presence of air and steam and combined with the copper to form sulphate of copper. Any sulphuric acid that may be mechanically carried along by the gases is absorbed, and from eighty to ninety per cent. of the sulphurous acid is converted into sulphuric acid and likewise absorbed, so that a concentrated solution of sulphate of copper of 35° Baumé is finally obtained. Experiments have proved that the oxidizing influence of this solution remains the same after all the metallic copper has been converted into sulphate of copper; hence it is obvious that its oxidizing influence is due solely to the sulphate of copper, the presence of which enables the oxygen of the air to oxidize the sulphurous acid. In other words, said sulphate-of-copper solution forms the carrier of the oxygen in an analogous manner to the nitrous acid in the sulphuric-acid chambers. The following experiments will clearly demonstrate this: If a strong acid solution of sulphate of copper ($CuO.SO_3$) is boiled with metallic copper, ($Cu$,) its color is changed from a clear blue to a dirty green. By adding water, metallic copper, and by adding common salt, subchloride of copper ($Cu_2Cl$) is precipitated. By the reducing action of the metallic copper on the sulphate-of-copper solution, a small quantity of the sulphate of suboxide of copper ($Cu_2O.SO_3$) is formed, which remains dissolved by the strongly acid solution, but which, by the addition of water, is decomposed into metallic copper ($Cu$) and sulphate of copper ($CuO.SO_3$), the former of which is precipitated. If air be blown into the solution containing said sulphate of suboxide of copper, the blue color is restored, after which, by the addition of water, neither metallic copper is precipitated nor, by the addition of salt, subchloride of copper formed, because the sulphate of the suboxide has been changed by the oxygen of the air into sulphate of copper. If a strong and not too acid solution of sulphate of copper be similarly subjected to the continuous action of sulphurous acid, the sulphate of copper is similarly reduced to a sulphate of the suboxide, as is indicated by the change of the blue color to a dirty green, which suboxide is oxidized again by the introduction of air. The reduction and oxidation, as described, take place in such rapid succession as to be practically simultaneous, so that the sulphurous-acid gas which has been introduced into said sulphate-of-copper solution is converted into sulphate of copper.

To carry out this experiment in practice, an apparatus is employed which is shown in the accompanying drawing, and which consists of an injector, A, which aspirates the gases from the flues, by which they are conducted off from the point of generation, and forces them, mixed with air and steam, into a tank or converter, B, through a ring, C, that is provided with a large number of small perforations at its lower part. The tank B is partly filled with water and metallic copper, into which solution the sulphurous-acid-bearing gases are injected with considerable force in a minutely-divided state, so as to rise through the solution. D is a pipe at the top part of the vessel B, through which the air and steam and other unabsorbed gases are carried off after having passed through the solution. As the gases conducted off from chemical and metallurgical works usually contain sulphurous-acid gas and sulphuric acid, which latter is carried along mechanically, the latter will be absorbed directly by the water, while the former will be continuously converted by the reactions described into sulphate of copper, and thereby also retained without being carried off with the remaining gases.

The sulphurous and sulphuric acid gases used by me were the products of my parting works. These gases contained in a cubic meter an average of one hundred grams sulphurous and twenty grams sulphuric acid, the remainder being air and steam. This average is equivalent to a content of about four parts of sulphurous acid in one hundred parts by volume or seven parts in one hundred by weight.

I am aware of the patents granted to Thomas S. Hunt and James Douglass, Jr., for methods of extracting copper from ores, which patents are numbered, respectively, 86,754 and 227,902, and dated February 9, 1869, and May 25, 1880, and I hereby disclaim the same.

Having thus described my invention, I claim as new and desire to secure by Letters Patent—

The method herein described of producing sulphate of copper by means of gases containing sulphurous acid, which consists in injecting said gases, in a fine state of division, jointly with air and steam, into an oxidizing solution of sulphate of copper containing free copper, substantially as and for the purpose set forth.

In testimony that I claim the foregoing as my invention I have signed my name in presence of two subscribing witnesses.

HEINRICH RÖSSLER.

Witnesses:
  F. VOGELER,
  A. S. HOGUE.